March 18, 1958 — E. P. LAUDAN — 2,826,850
FISHING BOBBER
Filed April 1, 1955
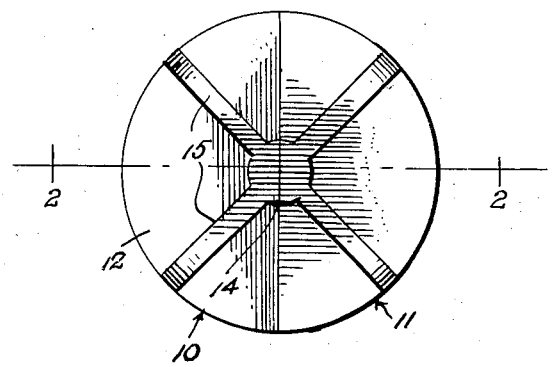
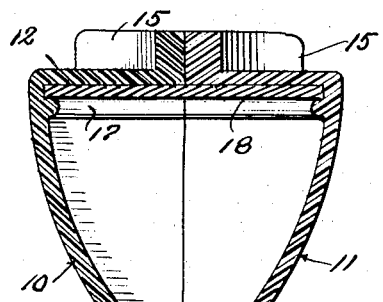
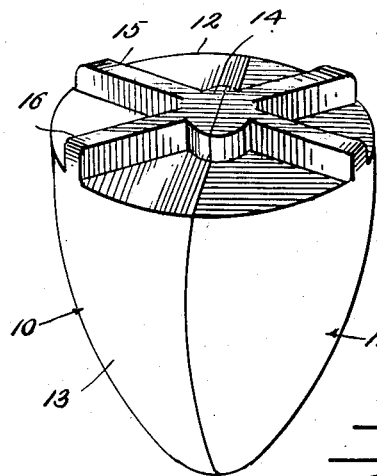
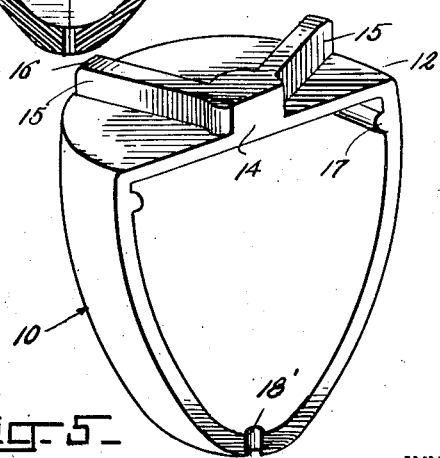
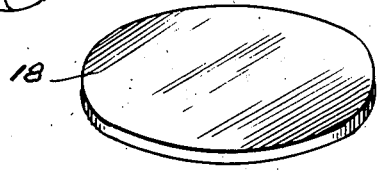
INVENTOR.
EDWARD P. LAUDAN
BY Patrick D. Beavers
ATTORNEY United States Patent Office 2,826,850
Patented Mar. 18, 1958

2,826,850

FISHING BOBBER

Edward P. Laudan, Dorchester, Mass.

Application April 1, 1955, Serial No. 498,606

2 Claims. (Cl. 43—17.5)

This invention relates to improvements in fishing appliances and more particularly to a fishing bobber, such as is used in floating fishing lines.

The principal object of the present invention is to provide a fishing bobber of suitable material and impregnated with a fluorescent dye, to the end that the bobber will produce a brilliant color intensity, intended principally to keep the fisherman's attention from wandering from his line and also to serve as an indication of a fish strike even when the bobber is seen from the corner of the fisherman's vision.

Another important object of the invention is to provide a fishing bobber of the character stated which is capable of being easily manufactured and retained at a low monetary figure.

Still another object of the invention is to provide a plastic fishing bobber which is impregnated with a fluorscent dye, so that the bobber can be easily seen on overcast days as well as sunny days.

A further object of the invention is to provide a simplified fishing bobber which will display a brilliant color glow during daylight to the end that it will always be visible and draw the fisherman's attention.

These and various other objects and advantages of the invention will become apparent to the reader of the following description.

In the drawing:

Figure 1 is a top plan view of the bobber.

Figure 2 is a vertical section taken on line 2—2 of Figure 1.

Figure 3 is a perspective view of the bobber.

Figure 4 is a perspective view of one section of the bobber.

Figure 5 is perspective view of the connecting wafer.

Referring to the drawing wherein like numerals designate like parts, it can be seen, that the bobber is shown perspectively in Figure 3 and is of general acorn shape. The bobber is divided vertically into a pair of hollow sections 10, 11. These sections are of some suitable plastic material, each having a flat top 12 and the downwardly curving side wall 13 and are fitted together by an adhesive to provide an air chamber. Further, the top 12 has a semi-cylindrical riser 14 which has a pair of ninety degree spaced fins 15 radiating therefrom and having curved outer end portions 16 which merge with the depending side wall 13.

It can be seen, that as the sections 10, 11 are brought together the risers 14 will form a short cylindrical column from which the fins 15 radiate at ninety degree spaced intervals.

On the inside of each of the walls 13 adjacent the top 12 thereof is a rib 17. Numeral 18 denotes an obscure wafer which may also be of plastic and which is preferably of a white color. This is inserted between the rib 17 and the top 12 of one of the sections and the other section is simply slipped over this with the projecting half portion of the wafer engaging between the corresponding rib 17 and top 12 of the companion section.

The sections 10, 11 are molded so as to form semi-cylindrical openings 18' at the lower constricted portions of the sections 10, 11, so that these portions of the sections 10, 11 can be brought over a suitable line holding element (not shown).

The fins 15 as well as the top 12, which have the property of passing light, are impregnated with a fluorescent dye. Of course this dye may be impregnated in the entire molded plastic bobber, but the main effect is accomplished by the dye content of the top 12 and fins 15. This fishing bobber may be of different colors, molded of plastic, as stated, and with the daylight-fluorescent dye impregnation, utilizes the edge-light principal of such impregnated plastic to provide a fishing bobber of brilliant color intensity. Its advantage lies in the reflectance of the fluorescent dye by the white wafer 18, allowing the bobber in the water to be more readily visible than more conventional design.

The lower portions of the sections 10, 11 are somewhat thickened to accommodate the line attaching element (not shown).

The sections are suitably sealed together enclosing the preferably white plastic wafer 18.

It will be observed that the main feature of this bobber over conventional structures in this class is the presence of the radial fins and riser, which impregnated with daylight fluorescent dye, collect and reflect through the fins 15, curved ends 16 and riser 14, the light striking the bobber, utilizing the edge-light principle, causing a brilliant glow to the bobber.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

1. A fishing bobber comprising a two-part shell of hollow construction and adapted to be fitted together by adhesive to provide an air chamber, said shell being of downwardly constricting side wall construction and formed with a flat top surface, fins extending upwardly on the flat top and containing a colored material, the top of the shell being of light passing property, said shell at the inner side of said top being provided with a backing plate for reflecting light upwardly through said fins.

2. A fishing bobber comprising a two-part shell of hollow construction and adapted to be fitted together by adhesive to provide an air chamber, said shell being of downwardly constricting side wall construction and formed with a flat top surface, fins extending upwardly on the flat top and containing a colored material, the top of the shell being of light passing property, said shell at the inner side of said top being provided with a backing plate for reflecting light upwardly through said fins, said sections of the shell being formed with ribs, slightly spaced from the top and upon which said backing plate is supported immediately under the top of the shell.

References Cited in the file of this patent

UNITED STATES PATENTS

| | | |
|---|---|---|
| 1,547,746 | Gore | July 28, 1925 |
| 2,054,454 | Thies | Sept. 15, 1936 |
| 2,527,956 | Peevey | Oct. 31, 1950 |
| 2,566,612 | Hearne | Sept. 4, 1951 |
| 2,691,839 | Duerig | Oct. 19, 1954 |

FOREIGN PATENTS

| | | |
|---|---|---|
| 1,034,455 | France | Apr. 8, 1953 |
| 1,063,984 | France | Dec. 23, 1953 |